(12) United States Patent
Juristovski et al.

(10) Patent No.: US 9,026,942 B2
(45) Date of Patent: May 5, 2015

(54) SONG LYRIC PROCESSING WITH USER INTERACTION

(75) Inventors: Alan Juristovski, Burnaby (CA); Milun Tesovic, Burnaby (CA); Sushant Sund, Vancouver (CA)

(73) Assignee: CBS Interactive Inc., San Francisco, CA (US)

( * ) Notice: Subject to any disclaimer, the term of this patent is extended or adjusted under 35 U.S.C. 154(b) by 119 days.

(21) Appl. No.: 13/396,592

(22) Filed: Feb. 14, 2012

(65) Prior Publication Data

US 2012/0221975 A1 Aug. 30, 2012

Related U.S. Application Data

(60) Provisional application No. 61/446,724, filed on Feb. 25, 2011.

(51) Int. Cl.
| | | |
|---|---|---|
| G06F 3/048 | (2013.01) | |
| G06F 17/30 | (2006.01) | |
| G10H 1/36 | (2006.01) | |

(52) U.S. Cl.
CPC ...... *G06F 17/30026* (2013.01); *G06F 17/3005* (2013.01); *G10H 1/365* (2013.01); *G10H 2220/011* (2013.01); *G10H 2240/131* (2013.01)

(58) Field of Classification Search
CPC ............ G06F 3/0482; G06F 17/30011; G06Q 30/0251
USPC ................ 715/823, 825, 251, 255; 705/14.53
See application file for complete search history.

(56) References Cited

U.S. PATENT DOCUMENTS

| | | | | |
|---|---|---|---|---|
| 6,941,275 | B1 * | 9/2005 | Swierczek | 705/26.61 |
| 7,689,682 | B1 * | 3/2010 | Eldering et al. | 709/223 |
| 7,711,564 | B2 * | 5/2010 | Levy et al. | 704/270 |
| 7,904,503 | B2 * | 3/2011 | Van De Sluis | 709/203 |
| 7,958,119 | B2 * | 6/2011 | Eggink et al. | 707/732 |
| 8,041,604 | B1 * | 10/2011 | Glaser | 705/14.4 |
| 8,306,859 | B2 * | 11/2012 | Lerman et al. | 705/14.73 |
| 8,396,800 | B1 * | 3/2013 | Wieder | 705/50 |
| 8,543,661 | B2 * | 9/2013 | Rhoads et al. | 709/217 |
| 8,554,681 | B1 * | 10/2013 | Wieder | 705/51 |
| 8,716,584 | B1 * | 5/2014 | Wieder | 84/616 |
| 8,805,854 | B2 * | 8/2014 | Chen et al. | 707/749 |
| 2006/0212444 | A1 * | 9/2006 | Handman et al. | 707/5 |
| 2008/0026355 | A1 * | 1/2008 | Petef | 434/307 A |

(Continued)

OTHER PUBLICATIONS

RapGenius: Check Rap Song Meanings Online, Aug. 25, 2010, pp. 1-4 http://www.makeuseof.com/tag/rapgenius-rap-song-meaning/.*

(Continued)

*Primary Examiner* — Kyle Stork
*Assistant Examiner* — Mario M Velez-Lopez
(74) *Attorney, Agent, or Firm* — Fenwick & West LLP

(57) ABSTRACT

A computer-implemented system (and method and computer readable storage medium) are disclosed for processing interactions with song lyrics. The system is configured to provide for display on a screen of a computing device the song lyrics. The system detects a selection of a segment of the song lyrics and provides for display a menu of options for interacting with the selected segment of the song lyrics. The system receives a selection of an option from the menu of options and updates, in a user interaction database, a data field corresponding to the selected segment with the selected option from the menu of options. The system executes the selected option from the menu of options.

13 Claims, 11 Drawing Sheets

(56) References Cited

U.S. PATENT DOCUMENTS

| | | | | |
|---|---|---|---|---|
| 2008/0270891 | A1* | 10/2008 | Friedman et al. | 715/240 |
| 2009/0006213 | A1* | 1/2009 | Lerman et al. | 705/14 |
| 2009/0125510 | A1* | 5/2009 | Graham et al. | 707/5 |
| 2009/0176520 | A1* | 7/2009 | B. S. et al. | 455/466 |
| 2009/0313127 | A1* | 12/2009 | Chaiken et al. | 705/14.72 |
| 2010/0114720 | A1* | 5/2010 | Jones et al. | 705/14.73 |
| 2010/0211464 | A1* | 8/2010 | Zhu et al. | 705/14.53 |
| 2011/0004520 | A1* | 1/2011 | Chou et al. | 705/14.53 |
| 2011/0185309 | A1* | 7/2011 | Challinor et al. | 715/784 |
| 2011/0258043 | A1* | 10/2011 | Ailaney et al. | 705/14.49 |
| 2011/0264519 | A1* | 10/2011 | Chan et al. | 705/14.49 |
| 2011/0279359 | A1* | 11/2011 | McCarty | 345/156 |

OTHER PUBLICATIONS

What is Rap Genius?, Dec. 22, 2010, pp. 1-2 http://rapgenius.com/static/about.*

Kissthisguy, The Archive of Misheard Lyrics, Nov. 24, 2010, pp. 1-4 http://kissthisguy.com/.*

Shazam (service), Apr. 23, 2010, pp. 1-2 http://en.wikipedia.org/wiki/Shazam_(service).*

Bruno, A., "Google, Bing Search Engines Turn to Music," Thomson Reuters, Jul. 6, 2010, 2 pages, Ekantipur.com, Kantipur Publications Pvt. Ltd, [Online] [Retrieved on Mar. 2, 2012] Retrieved from the Internet<URL:https://web2.westlaw.com/result/documenttext.asxp?rs=WLW12.01&scxt=WL&riti=1&rp=%2fFind%2fdefault.wl&rit=CLID_FQ . . . >.

* cited by examiner

SONG LYRIC PROCESSING WITH USER INTERACTION

CROSS REFERENCE TO RELATED APPLICATIONS

This application claims the benefit of U.S. Provisional Application No. 61/446,724, filed Feb. 25, 2011, which is incorporated by reference in its entirety.

COPYRIGHT NOTICE

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright CBS, Inc. and CBS Interactive, Inc. 2011-2012.

BACKGROUND

1. Field of Art

The disclosure generally relates to the field of analyzing song lyrics.

2. Description of the Related Art

Searches for song lyrics make up a significant portion of all Internet traffic. According to Microsoft, about 10 percent of all Internet search queries are entertainment-related, and about 70 percent of those searches are related to music lyrics. Users can search for and access song lyrics by way of web browsers or other applications on desktop computers, laptops, tablet devices, mobile devices, and the like.

A user wishing to read the lyrics of a song may visit one of a number of websites which have access to databases containing song lyrics and can display the lyrics to the user. Typically, the user conducts a search for song lyrics by entering search terms such as "lyrics", the song title, a line or phrase in the song, artist name, and the like, into a search engine. The search engine outputs a list of links to pages containing matches to the search terms. The user can select and view one or more of the pages to determine if they contain the song lyrics of interest.

Generally, once a user has found and viewed the song lyrics that he or she is looking for, the user will leave the lyrics page and move on to a new task. If the user wishes to view the lyrics of another song, the user typically conducts a new search using search terms entered into a search engine. Depending on the search results and the pages selected by the user, the user may or may not return to the website that he or she had visited for the earlier-searched lyrics.

Song lyrics websites typically display lyrics in a static form. Typically the lyrics for a particular song are displayed on one or more pages and if necessary the user can scroll down the page or navigate to subsequent pages to view the lyrics. There are generally few or no mechanisms to attract repeat visits or to encourage users to linger on the page or visit other pages within the same website.

Some song lyrics websites record the number of times a song lyrics page has been viewed. This data may be used to calculate licensing revenues to copyright owners or advertising income. However, there are generally few or no mechanisms to track particular song lyrics that users may be interested in. For example, there is a lack of mechanisms for increasing the engagement of users with song lyrics. There also is a lack of configurations to provide feedback to interested parties such as song lyrics providers, copyright owners, music artists, promoters, and the like regarding users' engagement with song lyrics.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
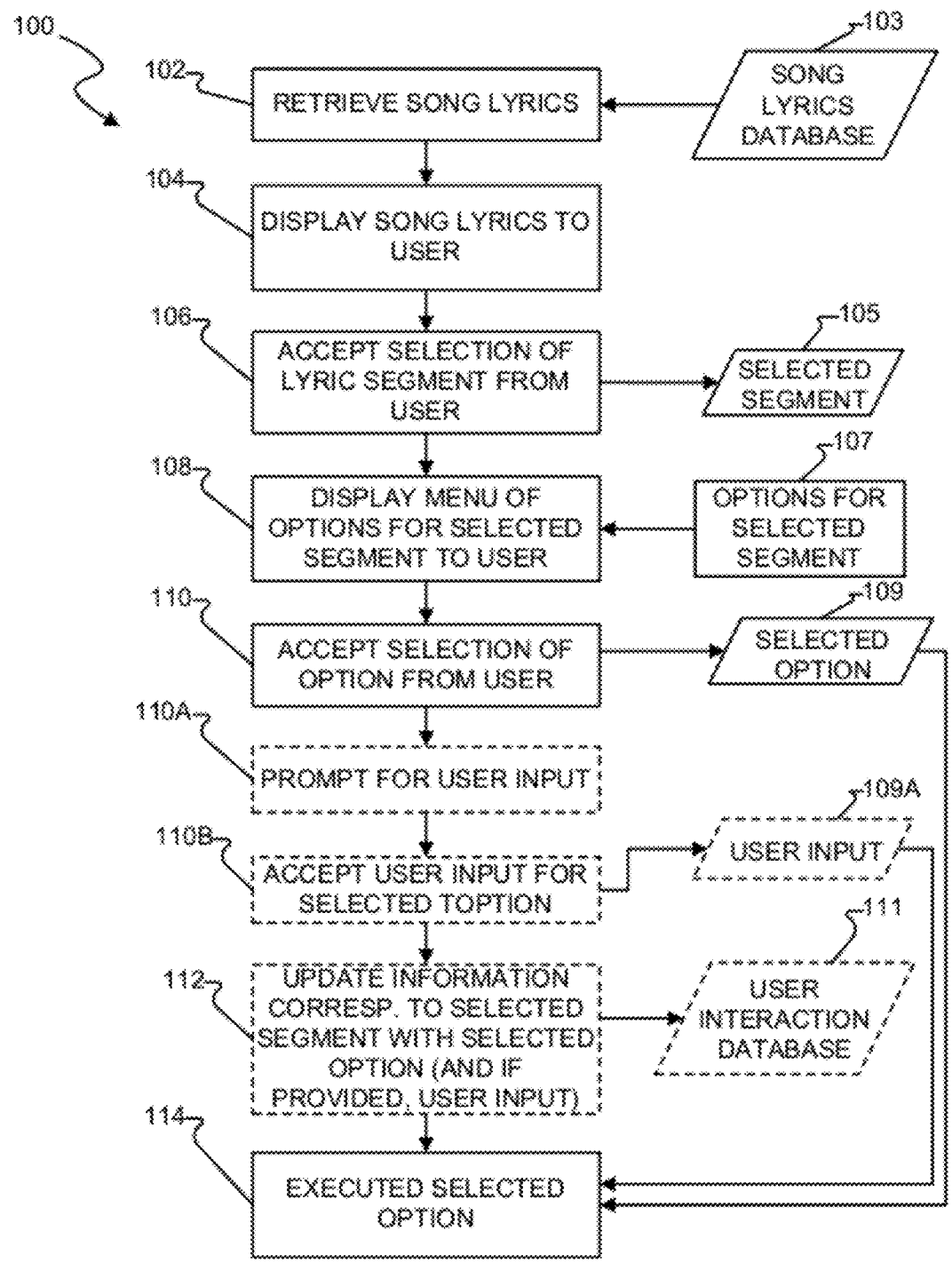
FIG. 1 is a flow chart illustrating a method according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Described are processes, apparatus and systems for processing and enabling user interaction with song lyrics in various ways. The interactive capabilities of song lyrics applications described herein can enhance a user's experience or engagement with the lyrics. Processes, apparatus and systems are also provided for generating, collecting and/or analyzing data concerning user interactions with lyrics. Such information can be leveraged by interested parties (e.g., song lyrics providers, copyright owners, music artists, music producers, music promoters, and the like) for a variety of purposes. Example purposes include advertising and marketing of music recordings, song artists or bands, events, and the like; selecting music for concerts or other performances; developing song lyrics which cater to fans; providing song lyrics information and song or artist recommendations to users to further increase users' engagement with the music and lyrics; etc.

According to particular embodiments, song lyrics are divided into segments. A segment may comprise a word, phrase, or line of lyrics. Users may interact with individual segments of the lyrics via a user interface by selecting a segment and indicating an action to be performed with respect to that segment. If the segment comprises a line of lyrics, such action may include, for example, submitting the user's interpretation of the line of lyrics, viewing other users' interpretations of the line of lyrics, submitting a corresponding line of lyrics indicating how the user misheard the lyrics, viewing corresponding lines of lyrics indicating how other users misheard the lyrics, sharing the line of lyrics with others through social media or social networking sites, copying the line of lyrics, adding the line of lyrics to a compilation of favorite lyrics, and emailing or text messaging the line of lyrics to a friend. This list is not intended to be exhaustive. Other actions may be performed with respect to a line of lyrics or other lyric segments.

Aspects disclosed herein provide methods, apparatus and systems for enabling user interaction with song lyrics in various ways. One aspect provides a processing data corresponding to song lyrics for enhancing user experience with those song lyrics. One example process includes displaying song lyrics to a user, accepting a selection of a lyric segment from the user, and displaying a menu of options for interacting with the song lyrics. The menu may be provided in response to an action such as a pointing device selection or a mouseover. The process also includes accepting a selection of one of the options from the user, updating a user interaction database entry corresponding to the selected line with the selected option, and executing the selected option. In particular embodiments, the lyric segment selected by the user comprises a line of lyrics.

Other aspects provide a system and apparatus to process song lyrics in order to enhancing a user experience with those song lyrics. Certain embodiments include a song lyrics server having an application stored thereon configured to display a plurality of lines of lyrics to the user, accept a selection of one of the lines from the user, and display a menu of options for interacting with the lyrics. The embodiment also is configured to accept a selection of one of the options from the user, update a user interaction database entry corresponding to the selected line with the selected option, and execute the selected option.

In particular embodiments, the menu of options displayed to a user for selection may comprise one or more of the following: enter or view an interpretation of the selected line, enter or view misheard lyrics for the selected line, share the selected line through a social media or social networking site, post the selected line to a blog, copy the selected line, add the selected line to a compilation of favorite lyrics, and email or text message the selected line. Further aspects include methods, apparatus and systems for generating, collecting and/or analyzing data concerning user interactions with lyrics.

Song Lyrics Interaction

Turning now to FIG. 1, it illustrates a process 100 for interacting with song lyrics according to one example embodiment. The process 100 may be performed by one or more components of system 20 as described below with reference to FIGS. 4 and 5. The process 100 begins by retrieving song lyrics from a song lyrics database 103 at block 102. The song lyrics retrieved at block 102 may be in response to a user's song selection, such as, for example, a particular song selected by the user in conducting a song lyrics search or browsing for song lyrics. The song lyrics retrieved at block 102 are displayed to the user at block 104. FIGS. 8A-8D show example computer screen user interfaces 50 displaying lyrics 52 for a particular song and interactions that may be undertaken with those song lyrics.

Figure 4:
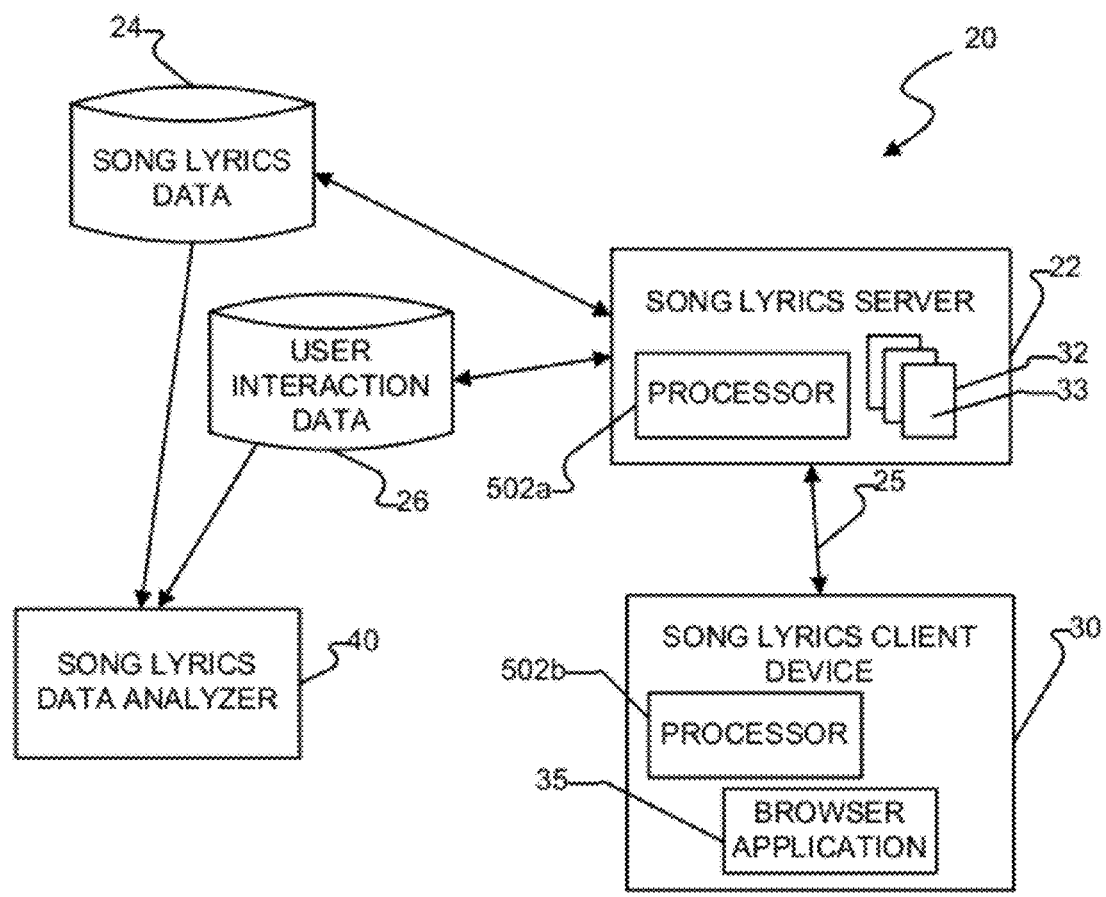
FIG. 4 schematically illustrates a system according to one example embodiment that may be used to implement one or more of the methods described herein.

Returning to FIG. 1, a lyric segment (e.g., one of the lines of lyrics displayed) can be selected through an interaction by a user. In particular embodiments, selection of a lyric segment may be facilitated by one or more of a number of selection mechanisms provided by a graphical user interface, such as, for example, a cursor or scrollbar controlled through a mouse or a touchpad, a touch-sensitive screen, physical or software buttons, and the like. Selection of a lyric segment may cause the selected segment to have its visual characteristic changed or altered, e.g., bolded, enlarged, changed color, highlighted or otherwise differentiated from surrounding lines or other lyric segments to indicate that the selection has been made. For example, FIG. 4 shows a segment 54 of lyrics (comprising a line of lyrics) selected by the user. The user's selected lyric segment 105 is accepted at block 106 of process 100 (FIG. 1).

Figure 8A:
FIG. 8A is a computer screen shot of an application showing a graphical user interface according to one example embodiment that may be used with the methods, apparatus and systems described herein.

A plurality of options 107 for the selected lyric segment 105 is displayed to the user at block 108. In some embodiments, options 107 may be displayed in the form of a drop-down menu. For example, the user interface illustrated in the screen shot of FIG. 8A shows an example drop-down menu 56 displaying various options (e.g. such as option 56A) for interacting with the lyric segment selected by the user.

In process 100 of FIG. 1, the user may select one of the options 107 (e.g., using a cursor or touch screen to select an option). The user's selected option 109 is accepted at block 110. For certain of options 107, the user is prompted for user input at block 110A. If prompted, the user may enter user input 109A corresponding to the user's selected option 109. User input 109A is accepted at block 110B.

By way of example, the process can be configured so that a system (e.g., as described with FIGS. 4 and 5), receives a data message corresponding to an action taken through a user interface displayed on a screen of a client device. The action is associated with user interaction with song lyrics displayed via the user interface on the screen of the client device. The action and interaction can correspond to a selection of one or more options 107 available for the interaction with the song lyrics. Options 107 for the selected lyric segment 105 may include one or more of the following:

enter/view interpretation (meaning) of the lyric segment;
enter/view misheard lyrics corresponding to the lyric segment;

share the lyric segment through a social media or social networking site (e.g., Facebook™, Twitter™, Myspace™, Google+™, etc.);

post the lyric segment to a blog or other site;

copy the lyric segment;

add the lyric segment to a compilation of favorite lyrics maintained by the user; and send the lyric segment to a friend (e.g., via email, text message, instant messaging, or other communication mechanisms).

Depending on the option selected, the user may be prompted to enter user input (e.g., text; login information; email address; etc.) corresponding to the selected option. For example, if the user selects the option to enter an interpretation for the lyric segment then the user may be prompted to enter text indicating his or her interpretation of the lyrics.

Similarly if the user selects the option to enter misheard lyrics then the user may be prompted to enter text indicating what lyrics he or she actually heard for that lyric segment when listening to the music. If the user selects the option to share or post a lyric segment to a social networking or blog site then the user may be prompted to enter login information for the site. If the user selects the option to send the lyric segment to a friend then the user may be prompted to enter the destination such as an email address or mobile phone number. Not all options will require user input. For example, if the user selects the option to copy the lyric segment or to add the lyrics to the user's favorite lyrics, then the user is not prompted to enter user input.

At block 112, the option selected 109 by the user, and, if provided, user input 109A may optionally be stored in some form for future use or analysis. In the illustrated embodiment, the user's selected option 109 and user input 109A is stored in a user interaction database 111 as an entry corresponding to the lyric segment 105 of the displayed song. User interaction database 111 may collect data regarding a user's selected option 109 and user input 109A for a particular lyric segment of a song, each time process 100 is performed. Data in user interaction database 111 may later be analyzed. For example, data in user interaction database 111 may be analyzed to generate profiles of users (e.g., including user's musical preferences) and to determine which song lyrics are attracting the most user interaction.

The option selected by the user is executed at block 114. For example, if the user had selected to view how others had misheard the lyric segment then one or more segments (e.g. lines) of misheard lyrics may be displayed. In some embodiments, the most common and/or most recently provided misheard lyrics may be displayed at block 114. As another example, if the user had selected to share the selected lyric segment 105 to a social networking site such as Facebook™ or Google+™, then at block 114 process 100 may cause the selected lyric segment 105 to be posted as a current Facebook™ status for the user.

Figure 2:
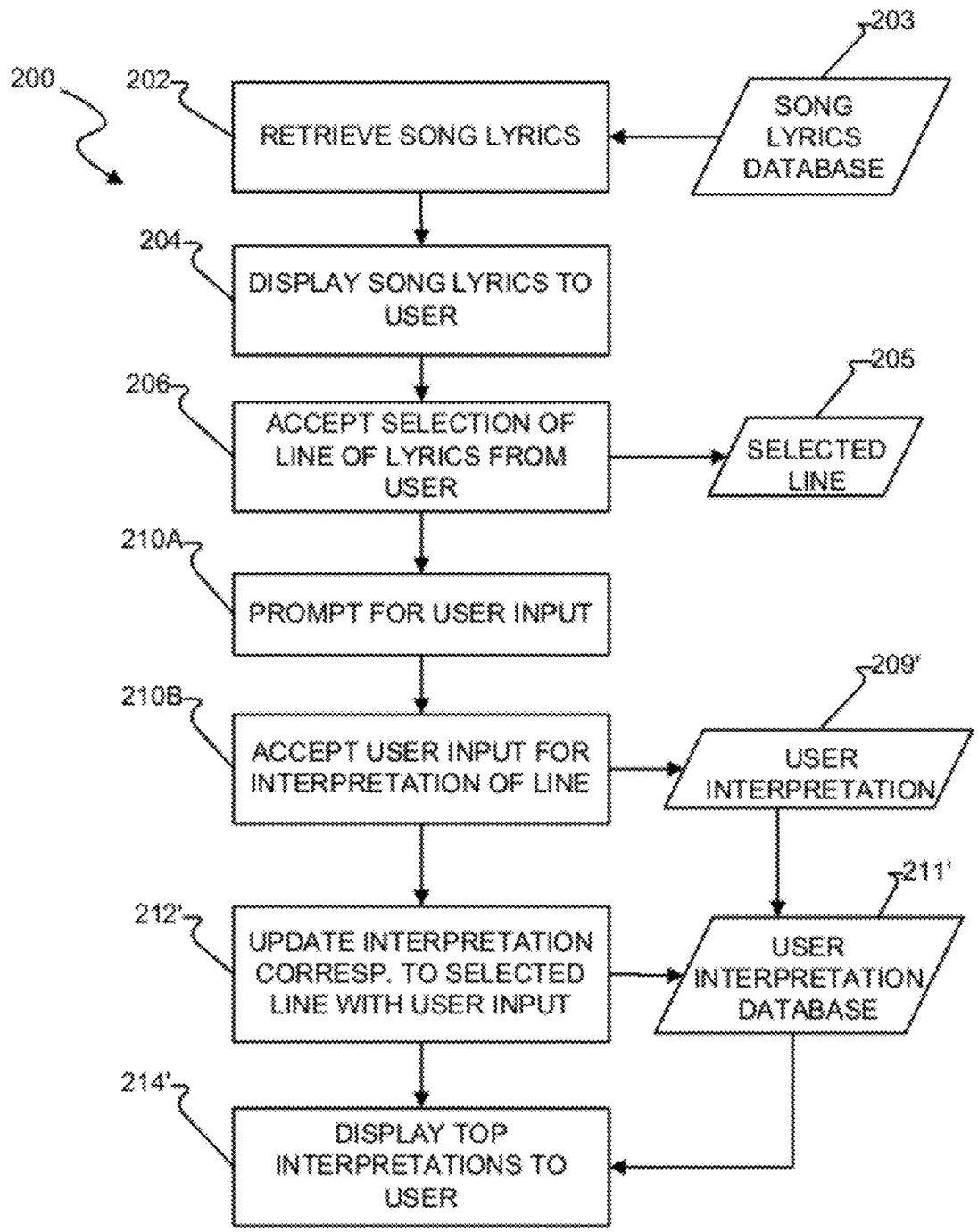
FIG. 2 is a flow chart illustrating a method according to another example embodiment.

Turning next to FIG. 2, it illustrates a process 200 for interacting with song lyrics according to another example embodiment. Process 200 may be performed by one or more components of system 20 which is described below with reference to FIGS. 4 and 5. Process 200 of FIG. 2 is similar in some aspects to process 100 of FIG. 1, and similar reference numerals are used herein to describe similar steps except that in process 200, the reference numerals begin with a "2" instead of a "1."

Process 200 begins similarly to process 100 by retrieving song lyrics from a song lyrics database 203 at block 202. The song lyrics retrieved at block 202 are displayed to the user at block 204. The user may select a lyric segment from the lyrics that are displayed. In the illustrated embodiment, each lyric segment consists of a line of lyrics, and the user may select one of the lines of lyrics displayed. The line of lyrics 205 selected by the user is accepted at block 206.

After selecting a line of lyrics 205, the user is prompted at block 210A to enter an interpretation for the selected line. The user's interpretation 209' may consist of text indicating the significance or meaning ascribed to the lyrics by the user. The user's interpretation 209' for the selected line of lyrics 205 is accepted at block 210B. At block 212', the user's interpretation 209' is stored in a user interpretation database 211' as an entry corresponding to the selected line of lyrics 205 of the displayed song.

User interpretation database 211' may be analyzed periodically or each time it is updated, to identify the most common interpretations for particular lyrics of lines. Similar interpretations may be grouped together for purposes of identifying most common interpretations. At block 214', the most common and/or most recently provided interpretations are displayed to the user (e.g., top three most common interpretations or top 10 most recent interpretations, or some combination thereof). In some embodiments, a songwriter's interpretation of the line of lyrics may be displayed to the user instead of or in addition to interpretations provided by users. The interpretations may be pre-stored within the systems described with FIGS. 4 and 5.

Figure 3:
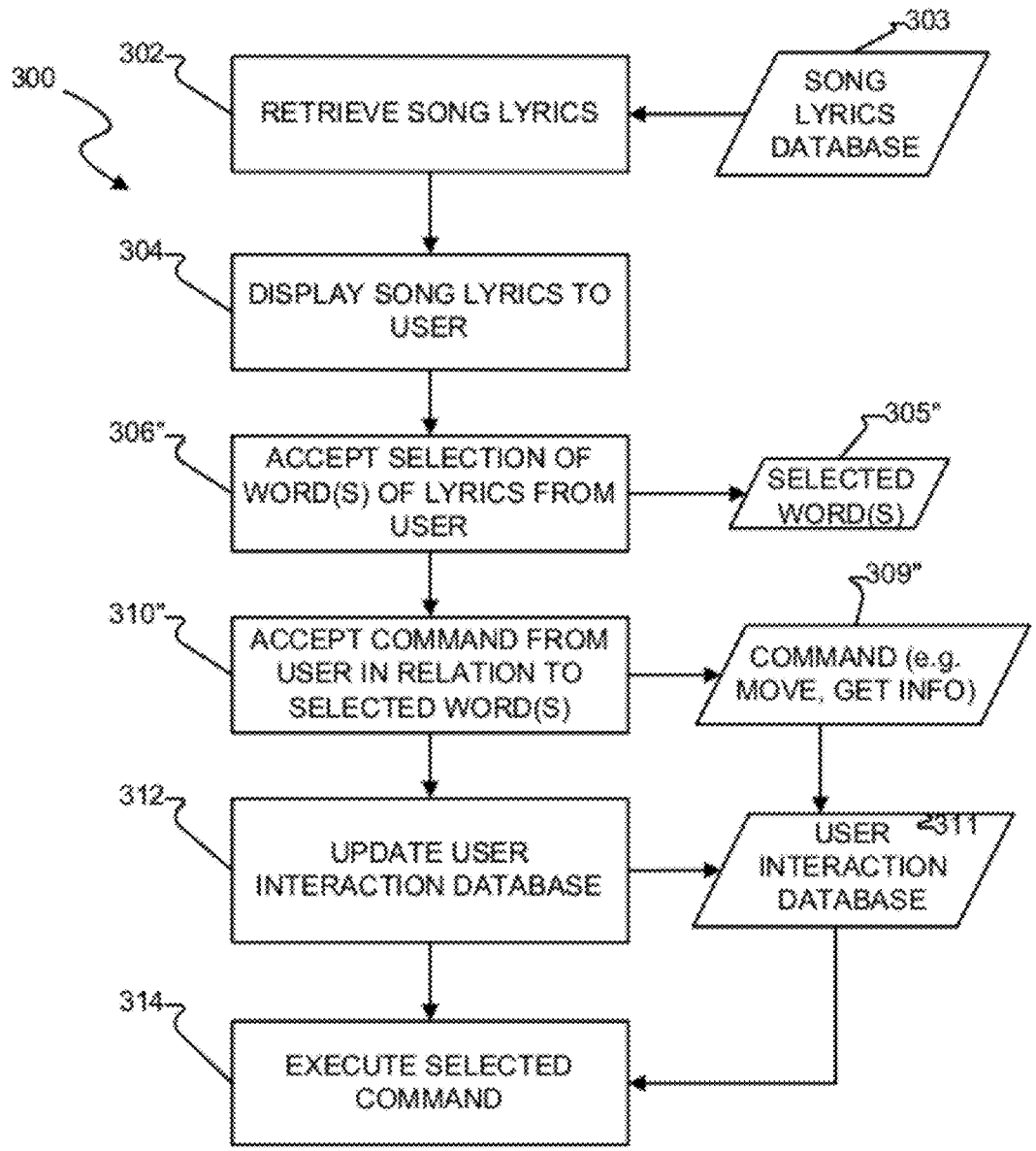
FIG. 3 is a flow chart illustrating a method according to another example embodiment.

Next, FIG. 3 illustrates a process 300 for interacting with song lyrics according to yet another example embodiment. Process 300 may be performed by one or more components of system 20 which is described below with reference to FIGS. 4 and 5. Process 300 of FIG. 3 is similar in some aspects to process 100 of FIG. 1 and process 200 of FIG. 2, and similar reference numerals are used herein to describe similar steps except that in process 300, the reference numerals begin with a "3" instead of a "2" or a "1."

Process 300 begins similarly to process 100 and process 200 by retrieving song lyrics from a song lyrics database 303 at block 302. The song lyrics database 303 is configured within a system as described in FIG. 4 or 5. The song lyrics retrieved at block 302 are displayed to the user at block 304. Process 300 differs from process 100 and process 200 in that instead of selecting a line of lyrics, for process 300 the user selects one or more words 305" of the lyrics displayed. The selected words 305" may comprise one or more portions of a line of lyrics (or lines of lyrics). The selected words 305" may or may not be consecutive words of lyrics. The user's selected words 305" are accepted at block 306".

After selecting words of lyrics 305", the user may enter a command 309" in relation to the selected words 305". The user's command 309" is accepted at block 310". The user's command 309" may comprise, for example, a command to move words to a new location within the lyrics (e.g., to scramble, unscramble, or form new lyrics), or retrieve information associated with the words (such as artistic interpretation, misheard lyrics, or other songs which contain the same words, etc.). The user may select command 309" from a drop-down menu of command options. In other cases the user may indicate command 309" by performing an action which is associated with such command, such as, for example, dragging and dropping a selected word to a new location within the lyrics.

At block 312, the user's command 309" is stored in a user interaction database 311 as an entry corresponding to the selected words 305" of the displayed song. Data stored in user interaction database 311 may later be analyzed to learn about how users are engaging with lyrics. At block 314, the user's command 309" is executed.

In some embodiments, to test users' knowledge of lyrics or to provide entertainment to users in the form of a game, lyrics are initially displayed at block 304 in a scrambled form. A user then seeks to put the words in the correct order by selecting words and dragging and dropping the selected words to new locations.

The configuration of the processes described above provide for enhanced features. For example, the user interfaces as illustrated in FIGS. 8A-8D can be enhances to provide additional optional features. These examples include one or more of the following features that may be combined with one or more of the processes described herein:

- musical notations such as piano keys, guitar tabs or other musical information may be displayed on top of or beside the lyrics (e.g., a microphone coupled with an audio processor detects musical notes and/or lyrics and analyzes those against pre-stored music to determine whether a match is found; if so, the configuration allows for retrieving the song corresponding to the audio detected and provides for display of the lyrics at the appropriate point by what is analyzed by the audio processor at that point in time);
- if music corresponding to the song lyrics is being played, a moving progress bar or other indicator (e.g., highlighting lyrics or changing display of lyrics) may be displayed in synchronization with the music to indicate a portion of lyrics currently being sung (e.g., a chorus, line or lines of lyrics), or may be specifically timed with a performing artist's recorded performance to indicate a specific word or portion of word being sung by the artist (e.g., for karaoke applications);
- original handwritten lyrics (e.g., as provided by the artist) may be displayed on top of or beside the lyrics; and
- the font of a particular lyric segment (e.g., word, phrase (two to a few consecutively selected words) or line (a "sentence like" length of a set of consecutive words) may be enlarged or highlighted in some other manner when a cursor is placed over the segment.

It is noted that the one or more optional examples provided above may be displayed through a variety of ways including an overlaid window, a new window, or the like. In some embodiments, the user may have the option of toggling on or off one or more of the above features.

System Configuration

Referring now to FIG. 4, it illustrates a system 20 according to one example embodiment to perform one or more of the processes described herein. For example, one or more components of system 20 may implement process 100 described with FIG. 1, process 200 described with FIG. 2 or process 300 described with FIG. 3.

System 20 includes a song lyrics server 22, a song lyrics client device 30, and a song lyrics database 24. In the illustrated embodiment, system 20 includes a user interaction database 26. In other embodiments, user interaction database 26 is omitted. Song lyrics database 24 and user interaction database 26 may be stored in suitable storage media accessible to server 22. Song lyrics database 24 and/or user interaction database 26 may or may not be stored at the same location as server 22.

In one embodiment, the system is configured to receive a response to a request from a client device 30 for the server 22. The server 22 retrieves song lyrics content from song lyrics database 24, and delivers (or transmits) such the song lyrics (or content) to client device 30 over a network connection 25. In some example embodiments system 20 includes a plurality of song lyrics servers 22. Servers 22 share the tasks of receiving requests for song lyrics from client devices 30 and, in response to such requests, delivering to client devices 30 song lyrics retrieved from song lyrics database 24.

The network connection 25 may comprise one or more connections over an Internet and/or cellular network which communicatively couple server 22 with client device 30. While only one client device 30 is shown in FIG. 4, this is for ease of illustration only, and in practice several client devices 30 may be communicatively coupled to server 22 at any one time. Client device 30 may comprise any suitable device that is configured to establish a network connection 25 with server 22, for example, a desktop computer, laptop, tablet device, a smartphone, a mobile computing device, or other like device with a network connection capability (e.g., a WiFi, wired, or cellular connection).

Continuing with the description of system 20, in some embodiments it may include a user interaction database 26. User interaction database 26 is configured to store information corresponding to user interactions with song lyrics. In addition, system 20 may also include a song lyrics data analyzer 40. Song lyrics data analyzer 40 is configured to analyze the data recorded in user interaction database 26. In some embodiments, song lyrics data analyzer 40 runs on the same machine that houses user interaction database 26.

In the FIG. 4 example embodiment, server 22 has a web application 32 stored thereon. Web application 32 may be executed by a processor 502a of server 22 to perform one of the processes described herein. Client device 30 has a browser application 35 (or other suitable application (e.g., an app executable on tablet, a mobile device or smartphone)) stored thereon which may be executed by a processor 502b of client device 30. The browser application (or other suitable app) is configured to provide access to web application 32 on server 22.

In one embodiment a user (not shown) operates client device 30. Client device 30 provides generates a user interface on a screen (e.g., through the browser application 35) through which a user may interact. The actions performed as a part of the interaction correspond to user input that is relayed to web application 32 on server 22. Web application 32 may comprise a plurality of web documents 33 written in a format which can be interpreted and displayed by browser application 35 on client device 30 (browser application 35 acts as a client for web application 32). Web application 32 and browser application 35 may facilitate the retrieval and display of lyrics and user interaction with one or more segments of lyrics.

To illustrate an example operation of system 20, the following example demonstrates how process 100 of FIG. 1 may be implemented by system 20. It is noted that system 20 may similarly implement process 200 of FIG. 2 and process 300 of FIG. 3. In this example, a user operating client device 30 takes an action, e.g., makes a selection, through a user interface of the browser application 35 displayed on a screen of client device 30. In this example, the action corresponds to a request to download a particular song lyrics for a particular song, e.g. "Hallelujah" by Leonard Cohen. The action is packaged as a request and is sent (or transmitted) to server 22 through browser application 35 and network connection. Web application 32 on server 22 receives the request and interprets it. Web application 32 retrieves the requested song lyrics from song lyrics database 24 (block 102 of process 100), packages it as a data packet for transmission via network connection and sends (or transmits) the packet with song lyrics to browser application 35 for display on client device 30. Client device 30 receives the data packet and provides it to browser application 35 for output/display on a screen of client device 30 (block 104 of process 100).

With the lyrics displayed on the screen of client device 30, the user can take further actions on the displayed lyrics through the user interface of the browser application 35. For example, one action a user may undertake is selection of a segment of the lyrics (e.g., a line of lyrics, such as, "She broke your throne and she cut your hair"). The selected segment is packaged as data packet and sent to server 22 through the network connection. Web application 32 on server 22 receives the data packet corresponding to the selection (block 106 of process 100). At server 22, web application 32 interprets the action and subsequently sends back a data packet that provides one or more options for the selected segment to browser application 35 on client device 30 (block 108 of process 100). Where the selected segment is a line of lyrics, such options may include, for example, enter/view interpretation of the line of lyrics; enter/view misheard lyrics corresponding to the line of lyrics; share the line of lyrics through a social media or social networking site; post the line of lyrics to a blog or other site; copy the line of lyrics; add the line of lyrics to a compilation of favorite lyrics; and send the line of lyrics to a friend (e.g., via email, text message, instant messaging, or other communication mechanism).

Through another interaction of the user interface of browser application 35, a user can undertake an action corresponding to one of the options. For example, the user may select an option of entering or viewing a lyrical interpretation. In the example case in which the user selected to enter/view lyrical interpretation, the user is prompted for user input (block 110A of process 100). The user may provide user input for the selected option (e.g., "deriving pleasure from submission/weakness"). The selected option and user input are sent as a data packet to server 22 where it is received by web application 32 (blocks 110, 110B of process 100). Server 22 may also send information regarding the user interaction (e.g., song title, song artist or band, line of lyrics selected, option selected and user input) to user interaction database 26 (block 112 of process 100).

Web application 32 on server 22 executes the selected option (block 114 of process 100). In the present example, execution may comprise retrieving common interpretations for the selected line of lyrics from user interaction database 26 and displaying the user's entered interpretation along with common interpretations (e.g., "reference to the Biblical story of Samson and Delilah").

As can be appreciated from the above-described example, the processes of interacting with lyrics described provides benefits such as encouraging users to learn about various aspects of the song lyrics, such as the meaning of certain lyrics. Moreover, users can contribute to the information concerning song lyrics by inputting their own interpretations or misheard lyrics. For example, one option can include a user interface on web application 35 for a user to enter in text data corresponding to a user interpretation of a phrase or sentence or the entire song of the song lyrics. The text data is received by server 22 and forwarded to user interaction database 26. User interaction database 26 stores the text with the song so that it may be retrieved for subsequent further processing, e.g., by song lyrics data analyzer 40. Examples of subsequent processing include allowing the user to retrieve the user interpretation at a later date or allow for display to other users seeking information on how particular aspects of the song were interpreted.

All information corresponding to a song or parts of a song can be captured and stored in a repository (e.g., user interaction database 26 or other database) and shared with other users of the song lyrics website. Users need only visit one site in order to interact with and learn about the lyrics and share their own experiences with other users. The ability to interact with song lyrics may enhance a user's experience with song lyrics, and may encourage users to spend longer periods of time reading and exploring song lyrics. Moreover, user interactions with song lyrics generate data that can be collected and analyzed, and used by song lyrics providers, song artists, music producers, advertisers, etc., as described herein. Hence, the system and process described herein provides for a unique social experience through song lyrics.

System 20 of FIG. 4 illustrates one example embodiment of a system that may be used to perform the methods described herein. Other implementations are possible. For example, the various databases may be combined within one physical configuration but logically separated.

Example Computing Architecture

Figure 5:
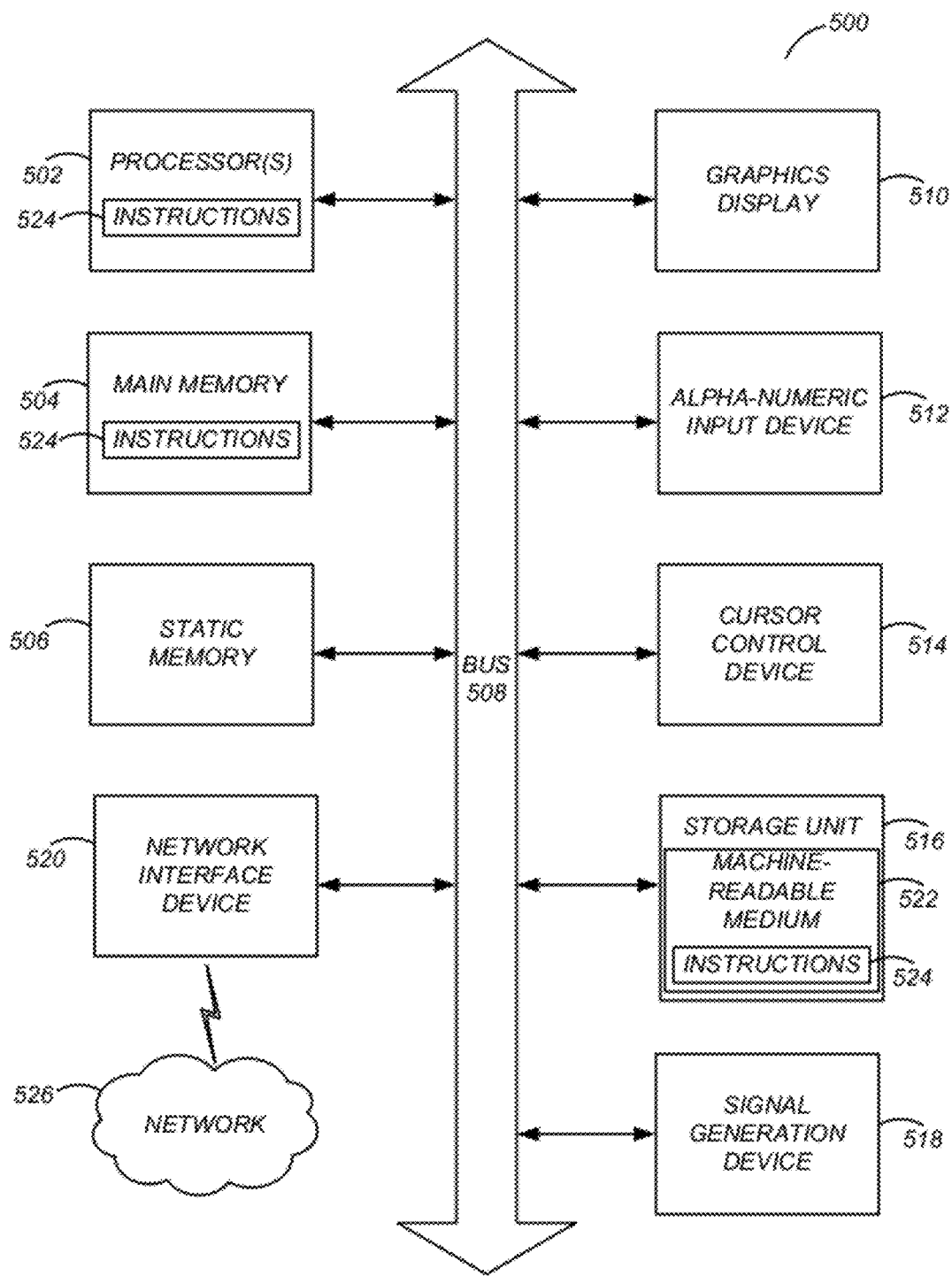
FIG. 5 illustrates one embodiment of components of an example machine able to read instructions from a machine-readable medium and execute them in a processor (or controller).

The components, e.g., serve 22, song lyrics database 24, user interaction database 26, song lyrics data analyzer 40, and client device 30, described with FIG. 4 are processed by one or more machines (or computing systems). An example of a machine is illustrated in FIG. 5. In particular, FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors (generally 502) (e.g., a central processing unit (CPU), a graphics processing unit (GPU), a digital signal processor (DSP) (including audio processor), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 108. Not shown, but also may be included with the architecture, includes input/output interfaces, for example, a microphone or a speaker that couples with a digital signal processor (e.g., an audio processor).

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

In sum, and as noted previously, the computing system 500 is configured to execute one or more of the methodologies described herein. This includes, for example, the processes described in FIG. 1 (process 100), 2 (process 300), or 3 (process 300) can be embodied as instruction that can be stored as in storage unit 516 and/or memory 504 and executed by processor 502. The computing system 500 also can be configured to execute other processes within the system 20 as further described herein (e.g., through FIGS. 6A-6C, 7 and 8A-8D).

Lyrics Space Analysis

Figure 6A:
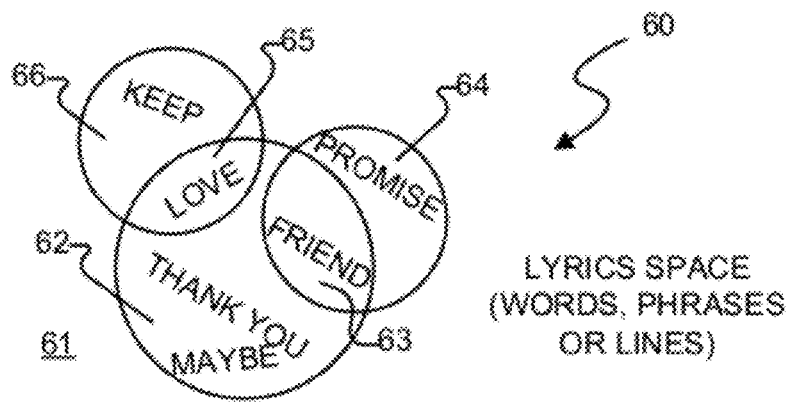
FIGS. 6A, 6B and 6C illustrate user interaction data in lyrics space, song space and artist space, respectively.
Figure 6B:
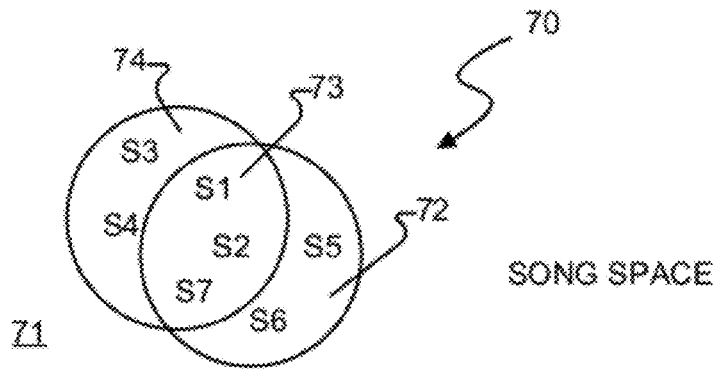
Figure 6C:
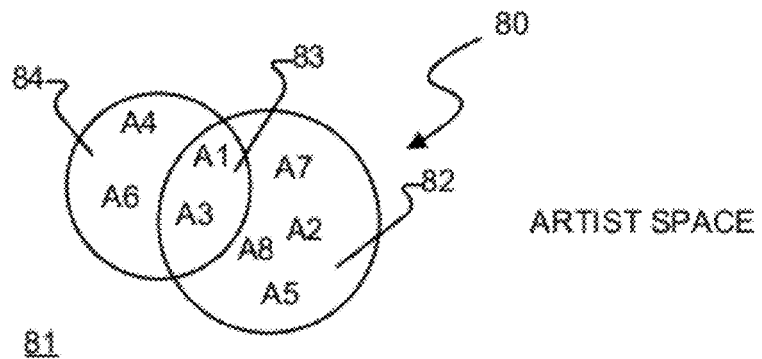

FIGS. 6A, 6B and 6C show example ways in which data collected about user interaction with lyrics may be analyzed in lyrics space, song space and artist space, respectively, e.g., through song lyrics analyzer 40. As explained in further detail below, each figure shows a circle whose interior represents a set of objects (e.g., song lyric words, songs, or artists) selected by users in the process of interacting with lyrics. Such set of objects may be generated by recording user interaction with lyrics (e.g., a user performing an action with respect to a segment of lyrics) in accordance with one or more of the lyric interaction methods described herein. Such set of objects may be compared to other sets of objects in the same space.

FIG. 6A illustrates sets of words 60 in a lyrics space 61. FIG. 6A depicts a set 62 of song lyric words containing words that are most commonly selected by users for interaction purposes (e.g., such words may be part of lines which are most commonly selected by users for entering or viewing lyrical interpretations, or sharing through a social networking site, etc.). In the illustrated example, set 62 contains the words "love", "friend", "thank you" and "maybe" as words which are most commonly selected by users when interacting with lyrics. Two other sets 64, 66 of song lyric words are shown in FIG. 6A. Set 64 contains the words "keep" and "love" and set 66 contains the words "promise" and "friend." Each of sets 64, 66 may contain words appearing in the song lyrics for a particular song. One can determine whether there is any correlation between the popularity of each song (measured using metrics such as number of song downloads, radio plays, etc.) and the degree of overlap 63 between sets 62, 64, and the degree of overlap 65 between sets 62, 66. For example, in some cases, there may be a correlation such that the degree of overlap is indicative of the popularity of the songs associated with sets 62, 64.

Next, FIG. 6B illustrates sets of songs 70 in a song space 71. A set of songs 72 is shown containing songs having lyrics which are more commonly selected by users for interaction purposes (e.g., each song within set 72 may be one for which more than a predetermined threshold number of user interactions with the lyrics have been recorded). In the illustrated example, set 72 contains songs S1, S2, S5, S6 and S7 as songs having lyrics which have the most recorded user interactions. Another set of songs 74 is shown, containing songs performed by a particular artist. In the illustrated example, set 74 contains songs S1, S2, S3, S4 and S7. One can compare the popularity of the songs contained in the overlapping region 73 between sets 72, 74 with the popularity of the songs in set 74 outside region 73 (the popularity of songs may be measured using metrics such as number of song downloads, radio plays, etc.), to determine the correlation if any between song popularity and the degree of user interactivity with the song lyrics.

FIG. 6C illustrates sets of song artists 80 in an artist space 81. A set of song artists 82 is shown containing artists who are associated with song lyrics that are more commonly selected by users for interaction purposes (e.g., each artist within set 82 may be one for which more than a predetermined threshold number of user interactions with the artist's lyrics have been recorded). In the illustrated example, set 82 contains artists A1, A2, A3, A5, A7 and A8 as artists associated with song lyrics which have the most recorded user interactions. Another set of song artists 84 is shown, containing the most popular artists (e.g., popularity of artists may be measured using metrics such as number of songs on the charts, etc.). In the illustrated example, set 84 contains artists A1, A3, A4 and A6. By examining the degree of overlap between sets 82 and 84, one can determine whether there is any correlation between song artist popularity and the degree of user interactivity with the song artists' lyrics.

In one example embodiment, song lyrics data analyzer 40 can be configured to analyze correlations such as those identified with respect to the examples in FIGS. 6A, 6B and 6C. These correlations may reveal that in some cases, the degree of user interactivity with a song's lyrics is indicative of the popularity of that song with users. Therefore in some cases, based on data concerning user interaction with song lyrics, one can make an assessment as to which songs or song artists tend to be more popular with fans.

In some embodiments, users are prompted to register by setting up a user account. The user account allows a user to subsequently sign in to his or her account in order to access and/or interact with song lyrics provided by a lyrics site. In setting up the user account the user may be prompted to enter information about himself or herself (e.g. age, gender, etc.). Each user with an account may be able to create his or her own user page, containing, for example, saved favorite lyrics, or interpretations of lyrics. In some embodiments, anyone may access and/or interact with song lyrics without signing in to a user account.

As system 20 can be configured to store user information on each registered user, additional information can be analyzed to glean more refined details corresponding to particular song and lyrics. For example, demographic grouping information can identify details as to who particular songs or lyric style resonate with or how songs are interpreted by particular demographic groupings. Likewise, by analyzing data concerning user interaction with lyrics and examining general trends in such data, system 20 can be configured to generate user profiles (or recommendations) that can be associated with particular user information for a user. User profiles may identify user preferences for particular genres of music (e.g. pop, hip hop, rock), lyrical subject matter (e.g. love songs, breakup songs, happy songs, sad songs), or song artists, etc. Such user profiles may be used by lyrics providers and other parties to recommend certain artists or songs to users. It is noted that in alternate embodiments, the user profiles may be generated real time based on interactions by a user with the system 20, but need not be stored with user information in cases where a user elects not to have such information stored for the particular user (although system 20 may store generically as a common pool of data not associated with any particular user).

In some embodiments, the most popular lines of lyrics in a song may be identified based on user interactivity with lines of lyrics. The most often misheard lines of lyrics may be identified based on the number of instances of users identifying the misheard lines. The extent of engagement that a song artist or band has with music fans may be measured by counting the number of user contributions to lyrical interpretations of songs performed by that song artist or band.

The information learned from analyzing users' interaction with lyrics may be used by song lyrics providers, copyright owners, music artists, music producers, music promoters, and the like, for a variety of purposes such as, for example: advertising and marketing of music recordings, artists, events, and the like; selecting music for concerts or other performances; developing song lyrics which cater to fans; providing song lyrics information and song or artist recommendations to users to further increase users' engagement with the music and lyrics; etc.

Data Records

Figure 7:
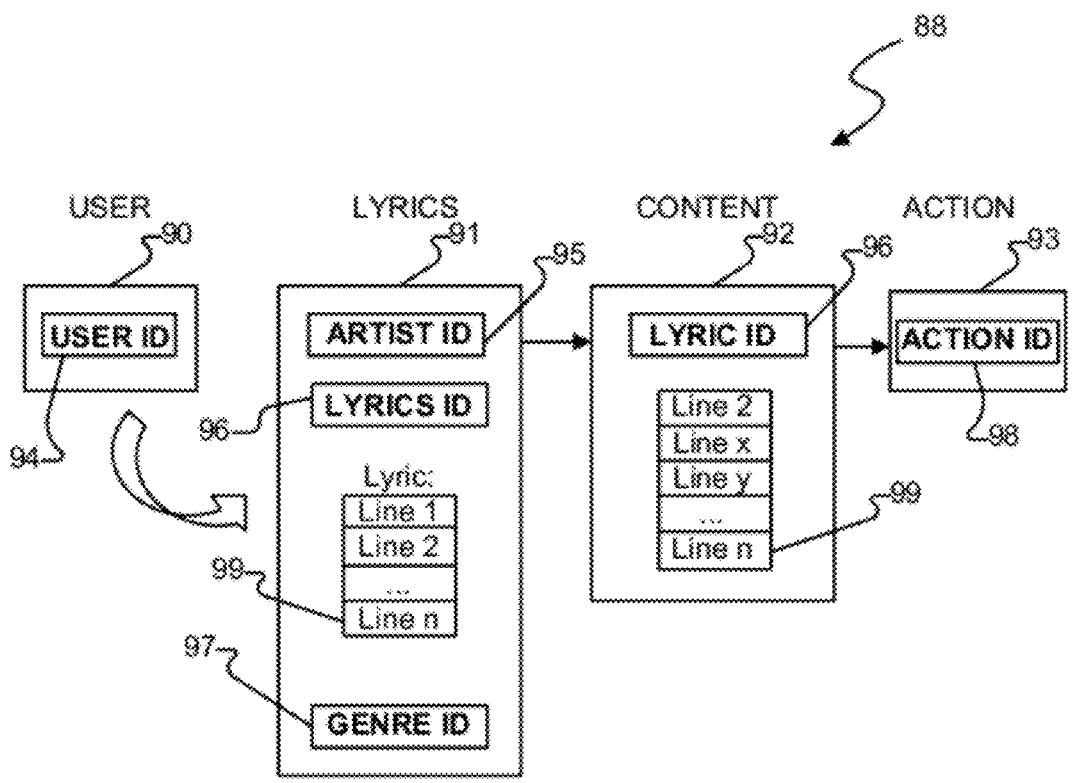
FIG. 7 schematically illustrates data that may be generated and later analyzed according to one or more of the methods described herein.

Turning now to FIG. 7, it illustrates data records 88 that may be generated according to one or more of the processes described herein (e.g. process 100 of FIG. 1, process 200 of FIG. 2 or process 300 of FIG. 3). As seen in FIG. 7, a user 90 is identified by a unique user ID 94. User ID 94 may be associated with particular user information (or characteristics), such as age, gender, location, etc. Some of the characteristics may be provided by the user (e.g., age and gender information provided when the user sets up a user account). Some of the characteristics may be obtained by other means, for example, the user's location (e.g., country) may be determined by retrieving the user's IP address or global positioning system (GPS location) on devices that use locations based services.

In one example embodiment, user 90 visits a particular song lyrics page 91 which is identified by a lyrics identifier (or identification) (ID) 96. In the illustrated embodiment of FIG. 7, lyrics ID 96 is associated with segments of lyrics, such as, for example, a plurality of lyric lines 99. Lyrics ID 96 is also associated with an artist ID 95 (identifying the song artist for the lyrics) and genre ID 97 (identifying the music genre).

User 90 interacts with specific content 92 on lyrics page 91. In the illustrated embodiment of FIG. 7, content 92 is identified by lyrics ID 96 and one or more lyric lines 99 selected by user 90. User 90 performs a specific action 93 (identified by action ID 98) on content 92. Action 93 may comprise an action undertaken by user 90 through a user interface of browser application 35 of client device 30. These actions include, for example, enter/view interpretation of the lyric line; enter/view misheard lyrics; share the lyric line through a social media or social networking site; post the lyric line to a blog or other site; copy the lyric line; add the lyric line to a compilation of favorite lyrics maintained by the user; or send the lyric line to a friend (e.g. via email, text message, instant messaging, or other communication mechanisms), etc.

Data as shown in FIG. 7 may be generated as users interact with song lyrics according to one or more of the processes described herein. The data may be received and collected (stored) in a user interaction database 26. The collected data can be simultaneously or subsequently analyzed by a song lyrics data analyzer 40. For example, song lyrics data analyzer 40 can review the collected data to match against present or past trends of similar data or data patterns. The trends can vary. For example the trend may be temporal such as time of a year when a particular song or song lyrics appears to have greater popularity (e.g., New Year's Eve or Fourth of July) or occasional. In another example, the trend may be based on demographics, such as a songs preferred by a particular age, gender, or location grouping. As the song lyrics database 24 and user interaction database 26 continue to grow, song lyrics data analyzer 40 can be configured to mine and analyze data at many levels, for example, user level, lyric level, artist level, action level, and the like.

As for analysis of the data, data can be analyzed by system 20 and stored in user interaction database 26 for subsequent retrieval and/or further processing by song lyrics data analyzer 40. For example, the type of data song lyrics data analyzer 40 can process includes an analysis of user behavior. Examples of this analysis include:

Assessing type of activity preferred by a user. For example, is the user most likely to stay on his or her own user page, select lyric segments, share lyric segments with friends, or comment on lyrics? Interaction methods may be customized for each user based on the user's behavior. If the user is most often posting comments about misheard lyrics, for example, this could suggest that the user is attentive to song lyrics detail and song meanings. Other users' posts about misheard lyrics could then be presented to the user in question form to prompt the user for opinion, comment, or other engagement.

Patterns of user interaction with particular words or other segments of lyrics can be analyzed. For example, are there any specific words that trigger the user to interact with lyrics (e.g. "love", "break up", "cars", etc.)? A user's interaction with specific content may reveal the user's musical preferences. If a user has a high degree of interaction with the lyrics for a particular song, for example, then it may be considered that the user is a fan of the song artist, song, or genre. Based on such analysis, specific music content or advertisements may be targeted to the user, or the user may be connected to other users having similar interests.

If the gender of each user is known (e.g. the user supplies gender information when setting up a user account), user behavior may be analyzed to determine whether there is any difference as to how males and females interact with lyrics. This assessment may be used to customize interaction methods for each gender or provide specific content or advertisements based on gender.

In another example, song lyrics data analyzer 40 is configured to analyze at the lyrics level, data about user interaction with lyrics to determine:

Most engaging song lyrics (by song or by lyric segment)— the songs or segments of song lyrics attracting the most user interaction with the lyrics may be determined. The songs attracting the most user interaction may not necessarily be the same as the most commonly searched or displayed song lyrics. In some embodiments, the level of user interaction may be measured by counting the number of actions performed by users on segments of song lyrics.

Lyrics commonalities—the data may suggest if there are any common aspects of the lyrics that are receiving more attention (e.g., particular words; explicit content; seasonality, such as love songs on Valentine's Day).

Misheard or misinterpreted lyrics—based on user input, a database of commonly misheard or misinterpreted lyrics may be built.

Lyrics meaning—based on user input, a database of user interpretations of lyrics may be built.

Information about the most engaging song lyrics, lyrics commonalities, misheard lyrics, lyrics meaning, etc., may be shared with the music community (including songwriters) and other interested parties.

In yet another example, song lyrics data analyzer 40 is configured to analyze at the artist level, data about user interaction with lyrics to determine:

Song artist with the most engaging content—based on the data, one could determine which artists have song lyrics which attract the most user interaction. An analysis of the data may suggest reasons why certain artists attract more user interaction with their song lyrics (e.g., the song lyrics relate to a particular theme or contain particular words that attract the most user interaction).

Song artist lyric trends—the type of user engagement with the lyrics and user comments may suggest possible trends over time with respect to the writing of lyrics by a song artist.

Song artist engagement fan base—in some circumstances it can be inferred that a user who interacts with particular song lyrics by an artist is a fan of that artist. Therefore a song artists' fan base may be determined based on data concerning user interaction with lyrics.

As song lyrics data analyzer processes and analyzes data, this data can be stored in user interaction database 26 or other appropriate database. The collected analyzed data can then be shared with additional parties, for example, song artists, music producers, and other interested parties.

At the action level, data about user interaction with lyrics may be analyzed to determine, for example, most misheard lyrics, most shared lyrics, most favored lines, and the like. The data may also be used to determine what type of interaction is most commonly selected by users. This information can be used by song lyrics providers to enhance lyrics interaction methods.

By way of example of action level data analysis performed by song lyrics data analyzer 40 data corresponding to favored lines in a particular song lyric may be processed as follows. For each song lyrics from song lyrics database 24 served by song lyrics serve 22, user interaction database 26 tracks lines in which user action includes selection of a particular line and any associated corresponding data (e.g., metadata) such as user information, text entered by the user, etc. The line can be a complete line or may include a significant portion of the line. The lines and associated corresponding metadata are saved as "favorite lines" in user interaction database 26. When song lyrics data analyzer 40 is queried for most favorite line in a particular song, song lyrics data analyzer 40 retrieves the song and favorite lines data from user interaction database 26. Song lyrics data analyzer 40 processes the data, including further normalizing the data to match closely linked stored favorite lines such that whole saved lines are matched with substantially whole saved lines. In one embodiment, a natural language processor can assist with further processing. Once the data is normalized, song lyrics data analyzer 40 can provide the details on the most favorite line or lines in a particular song as well as additional data cleaned from the metadata such as demographics of users that provided the favorite line or lines.

Similar processing configurations could be user for other data. For example, a particular song can save data corresponding to most misheard lyrics in the user interaction database 26. In one example embodiment, users may enter through a user interface of the browser application 35 on the client device 30 text and/or other data as to particular lines in a song lyrics that were misheard and what the user heard as the misheard lyrics. As this data is stored in user interaction database 26, song lyrics data analyzer 40 can extract the song details and tally the line or lines most misheard within the song and provide additional details on the same such as what the lyrics were most often misheard as being as well as demographic information corresponding to particular of who misheard those lyrics.

Still other analysis configurations can be processed through the song lyrics data analyzer 40 as further described herein. Overall, the system 20 beneficially provides novel mechanisms to analyze and interact with song lyrics using both commercial and social data streams to gather details on song lyrics and process them accordingly.

User Interfaces and Interactions

Turning next to FIGS. 8A through 8D, illustrated are example visualizations in the form of example user interfaces corresponding to the processes described herein. Each user interface comprises computer code (e.g., instructions 524) that rendered for display (e.g., through browser application 35 or application (app)) on a screen of a client device, e.g., 30.

FIG. 8A is an example computer screen shot of an application showing a graphical user interface according to one example embodiment that may be used with the processes, apparatus and systems described herein. In this example, user interface 50 shows lyrics 52 for a song "Hot and Cold." A user viewing these lyrics in this example may elect to take an action to copy or share one or more lines, e.g., 54, of lyrics 52. For example, in one embodiment user action may include a selection of a line and "right" click on a mouse button of the computer system 500. This action causes the instructions 524 of the browser application 35 code to provide for display a drop down menu 56A (e.g., shown as an overlay menu) that includes actions user may take with respect to selected line 54. The options for actions available via menu 56A to be taken on selected line 54 that are presented to user include social sharing of selected line 54 (e.g., via Twitter™, Facebook™, email or eCard), copying a predetermined number of lines (e.g., less than the full set of lyrics 52 to preserve copyright rights of lyrics 52 owner), or view or add information for misheard lyrics. In one example embodiment, once an action is selected by user, e.g., copy a predetermined number of lines (or segments or portions) of a song lyric, system 20 receives the request through song lyrics server 22. Song lyrics server 22 retrieves those lines from song lyrics database 24, and song lyrics server 22 provides those lines for display on the screen of client device 30.

Figure 8B:
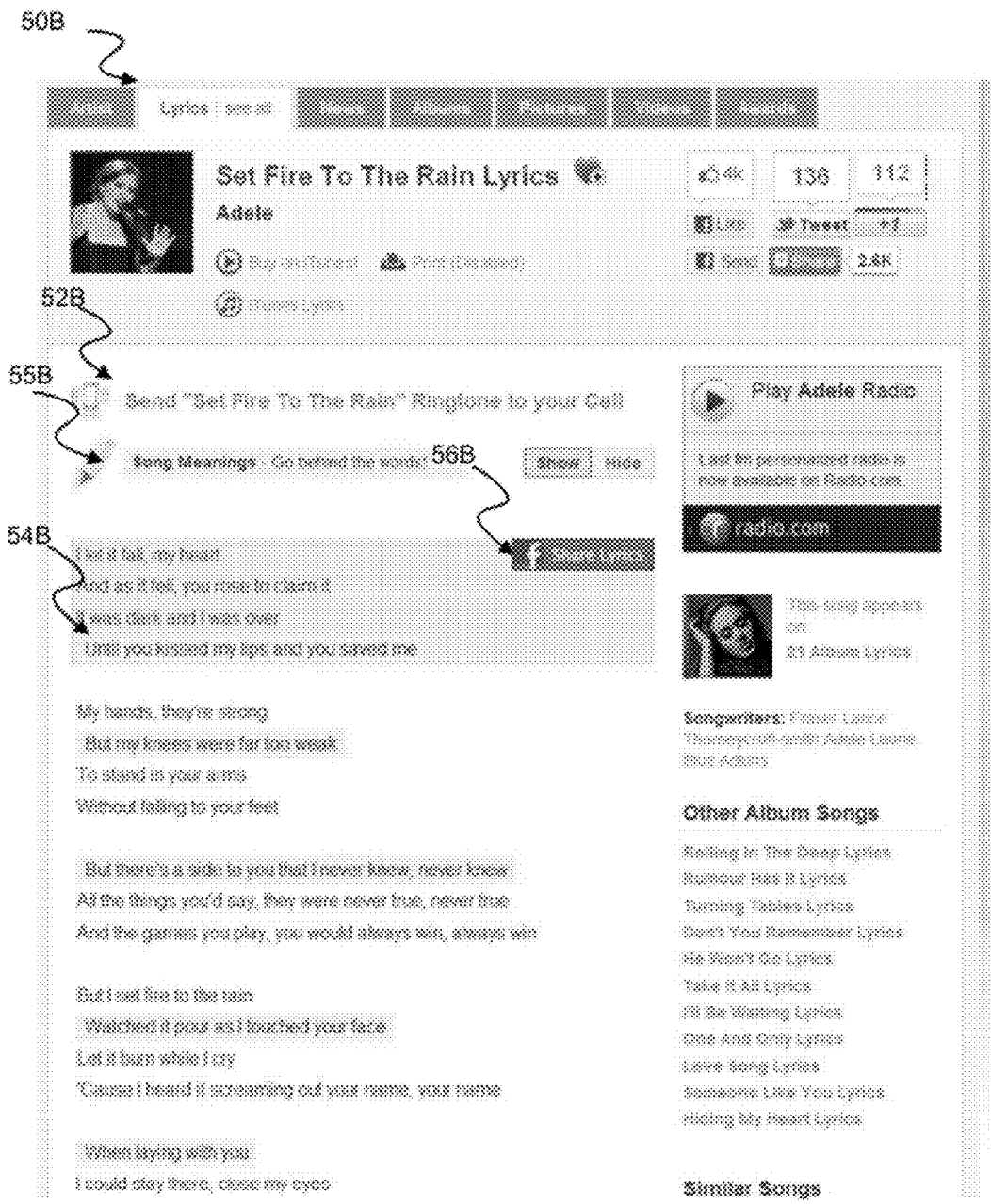
FIG. 8B is a computer screen shot of an application showing a graphical user interface for sharing lyrics and song meanings according to a second example embodiment that may be used with the methods, apparatus and systems described herein.

FIG. 8B is an example computer screen shot of an application showing a graphical user interface for sharing lyrics and song meanings according to a second example embodiment that may be used with the methods, apparatus and systems described herein. In this example, a user interface 50B provided for display shows song lyrics 52B for "Set Fire to the Rain." In this example, highlighted are options that are selectable by a user, for example, particular line or lines 54B, drill down for song lyrics meaning 55B, or socially share lyrics 56B. In this example configuration, when the user is presented with user interface 50B, user selects lyrics 54B for which some action is to be taken. In this example, a next action by a user would be to share lyrics 56B on a social networking site, e.g., Facebook™. In response to receiving at song lyrics server 22 selection of lyrics 54B and action to share lyrics on the social networking site 56B, song lyrics server 22 receives lyrics to be shared 54B from song lyrics database 24 and transmits it to an interface (not shown) for posting on social networking site selected by user 56B. In addition, song lyrics server 22, may log additional information received from client device, e.g., user details (based on login details from song sharing site and/or social networking site 56B, internet protocol address, global positioning system coordinates, and/or other information) in appropriate tables within user interaction database 26. Such data, as previously described, can assist with additional analysis by song lyrics data analyzer 40.

Figure 8C:
FIG. 8C is a computer screen shot of an application showing a graphical user interface for song meanings according to one example embodiment that may be used with the methods, apparatus and systems described herein.

As noted earlier with FIG. 8B, a user also has available through user interface 50B a selection for an action to retrieve song meanings 55B. FIG. 8C is an example computer screen shot of an application showing a graphical user interface for song meanings according to one example embodiment that may be used with the methods, apparatus and systems described herein. When song meanings 55B option is selected, song lyrics server 22 retrieves information about the song lyrics from song lyrics database 24. In this database, an author/artist of the song lyrics may have provided their interpretation of song lyrics 57. This information can be sent as is or further commented on, e.g., using analysis provided through song lyrics data analyzer 40, for transmission back to client device 30 for display through a user interface 50C. The information received back at client device 30 may be provided for display in one embodiment as an overlay on original user interface 50B. This information can further act upon, e.g., commented on, emailed, or socially shared 58. Alternately, or in addition, song lyrics data analyzer 40 may analyze data stored in user interaction database 26 corresponding to how the present user and/or other users interpreted 59 the particular song lyrics. This data also can be can be transmitted (or provided) back from the song lyrics server 22 to client device 30 for display through user interface 50B. This information can further act upon, e.g., commented on, emailed, or socially shared 58.

Figure 8D:
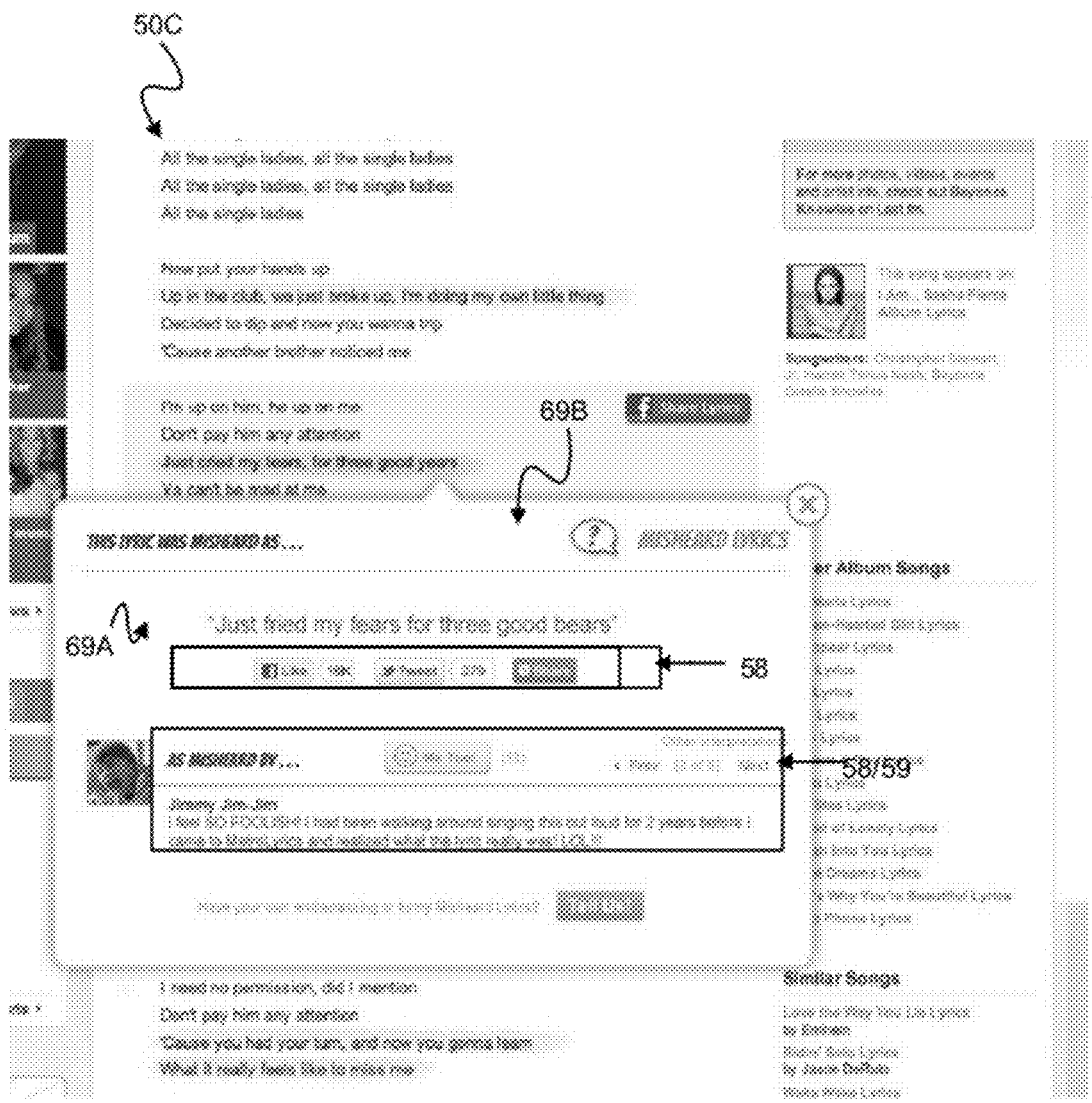
FIG. 8D is a computer screen shot of an application showing a graphical user interface for misheard lyrics according to one example embodiment that may be used with the methods, apparatus and systems described herein.

As previously noted, in some instances a user may inquire as to whether a particular lyric was misheard or what others may have misheard as particular lyrics. FIG. 8D is an example computer screen shot of an application showing a graphical user interface for misheard lyrics according to one example embodiment that may be used with the methods, apparatus and systems described herein. In this example, a user may select from a menu, e.g., 56A, an option to determine more information on misheard lyrics. This selection (or selection action) is sent to song lyrics database 22, which retrieves information about the song lyrics from song lyrics database 24 and triggers song lyrics data analyzer 40 to conduct an analysis of the misheard lyrics.

Song lyrics data analyzer 40 compares selected line to other data corresponding to misheard lyrics, e.g., as stored in user interaction database 26. Examples of processing by song lyrics data analyzer 40 on the misheard lyrics may include an analysis of a top predetermined number of most frequently misheard lyrics, most outlier misheard lyrics (e.g., base on most misheard words in a selected set of lyrics and further natural language processing of these words to gather meanings), or most interesting comments on misheard lyrics (e.g., as based on follow up comments and/or polling of prior inputted data on misheard lyrics).

Using the analysis provided through song lyrics data analyzer 40, song lyrics server 22 transmit back to client device 30 the information for display through a user interface 50C. The information 69A received back at client device 30 may be provided for display in one embodiment as an overlay 69B on original user interface 50B. This information can further act upon, e.g., commented on, emailed, or socially shared 58. Alternately, or in addition, song lyrics data analyzer 40 may analyze data stored in user interaction database 26 corresponding to how the present user and/or other users interpreted 59 the particular misheard song lyrics. This data also can be can be transmitted (or provided) back from the song lyrics server 22 to client device 30 for display through user interface 69B. This information can further act upon, e.g., commented on, emailed, or socially shared 58.

The song lyrics processes, apparatus, and systems as described herein enhance a user experience with song lyrics. Moreover, the processes, apparatus and systems described herein can apply to other literary works such as poems and literary readings so that further analysis and interactions with those enhance a user experience with those works.

Additional Configuration Considerations

Throughout this specification, plural instances may implement components, operations, or structures described as a single instance, e.g. server 22, databases 24, 26, analyzer 40, machines 500 and/or processors 502 used to process the methods embodied as computer readable instructions. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic, for example, the processes in FIGS. 1, 2, 3, and 8A-8D. This logic may be embodied in components, modules, or mechanisms, for example, within the configurations of the systems and machines described in FIGS. 4 and 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors 502 may also operate to support performance of the relevant operations in a "cloud computing" environment or as a "software as a service" (SaaS).

For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., memory 104), such as the processes in FIGS. 1, 2, 3, 6, 7, and 8A-8D. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for song lyric processing that incorporates user interactions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for processing interactions with song lyrics, comprising:
    providing the song lyrics for display on a client device;
    detecting a selection of a segment of the song lyrics by a user of the client device;
    providing, to the client device, a menu of options for the user to interact with the selected segment of the song lyrics of the plurality of song lyrics;
    receiving, from the client device, song lyric interaction data describing a user interaction with the selected segment of the song lyrics using a selected lyric interaction option from the menu of options;
    updating a user interaction database to store a song lyric interaction entry corresponding to the song lyric interaction data, the song lyric interaction entry identifying the user, the song lyrics, the selected segment of the song lyrics, and the selected lyric interaction option;
    retrieving, from the user interaction database, a plurality of song lyric interaction entries identifying song lyric interaction times of a plurality of user interactions of the user with selected segments of song lyrics;
    determining a temporal correlation between a time of year and one or more words in the selected segments of song lyrics based on the song lyric interaction times of the plurality of song lyric interaction entries;
    identifying correlated song lyrics comprising the one or more words of the determined temporal correlation;
    generating, by a processor, a musical recommendation for the user based on the correlated song lyrics responsive to a present time matching the time of the year of the determined temporal correlation; and
    providing the musical recommendation to the client device for display to the user.

2. The method of claim 1, further comprising:
    receiving additional song lyric interaction data describing additional interactions between the user and additional segments of song lyrics using a plurality of selected lyric interaction options from the menu of options;
    analyzing the additional song lyric interaction data to determine a most common selected lyric interaction option from the plurality of selected lyric interaction options; and
    instructing the client device to prompt further interactions with segments of lyrics based on the most common selected lyric interaction option.

3. The method of claim 2, wherein the plurality of selected lyric interaction options comprise at least one of: an interpretation of the selected segment of song lyrics, a misinterpretation corresponding to the selected segment of song lyrics, a selection of the selected segment as a favorite song lyric, and a user comment on the selected segment of song lyrics.

4. The method of claim 1, further comprising:
receiving additional song lyric interaction data describing additional interactions between the user and additional segments of song lyrics using a plurality of selected lyric interaction options from the menu of options;
identifying musical characteristics associated with the additional segments of song lyrics described by the additional song lyric interaction data, the music characteristics comprising at least one of: a song, a musical artist, a musical genre, and a lyrical subject matter; and
generating the musical recommendation based on the identified musical characteristics.

5. The method of claim 1, further comprising:
receiving targeting information from an advertiser, the targeting information comprising user demographic information selected from a group consisting of: gender, age, geographic locations, and other demographic groupings;
selecting one or more advertisements based on the analysis of the song lyric interaction data and the received targeting information; and
providing the selected one or more advertisements to the client device.

6. A non-transitory computer readable storage medium storing instructions, the instructions executable by at least one processor to cause it to:
provide the song lyrics for display on a client device;
detect a selection of a segment of the song lyrics;
provide, to the client device, a menu of options for the user to interact with the selected segment of the song lyrics of the plurality of song lyrics;
receive, from the client device, song lyric interaction data describing a user interaction with the selected segment of the song lyrics using a selected lyric interaction option from the menu of options;
update a user interaction database to store a song lyric interaction entry corresponding to the song lyric interaction data, the song lyric interaction entry identifying the user, the song lyrics, the selected segment of the song lyrics, and the selected lyric interaction option;
retrieve, from the user interaction database, a plurality of song lyric interaction entries identifying song lyric interaction times of a plurality of user interactions of the user with selected segments of song lyrics;
determine a temporal correlation between a time of year and one or more words in the selected segments of song lyrics based on the song lyric interaction times of the plurality of song lyric interaction entries;
identify correlated song lyrics comprising the one or more words of the determined temporal correlation;
generate, by a processor, a musical recommendation for the user based on the correlated song lyrics responsive to a present time matching the time of the year of the determined temporal correlation; and
provide the musical recommendation to the client device for display to the user.

7. The computer-readable storage medium of claim 6, further comprising instructions executable by at least one processor to cause it to:
receive additional song lyric interaction data describing additional interactions between the user and additional segments of song lyrics using a plurality of selected lyric interaction options from the menu of options;
analyze the additional song lyric interaction data to determine a most common selected lyric interaction option from the plurality of selected lyric interaction options; and
instruct the client device to prompt further interactions with segments of lyrics based on the most common selected lyric interaction option.

8. The computer-readable storage medium of claim 6, further comprising instructions executable by at least one processor to cause it to:
provide a plurality of song lyrics for display on a plurality of client devices configured to provide the menu of options for a plurality of users to interact with a plurality of segments of the plurality of song lyrics, the plurality of segments selected by the plurality of users;
receive a plurality of song lyric interaction data from the plurality of client devices, the song lyric interaction data describing user interactions between the plurality of users and the plurality of selected segments of song lyrics using the menu of options; and
update the user interaction database to store additional song lyric interaction entries corresponding to the plurality of song lyric interaction data.

9. The computer-readable storage medium of claim 6, further comprising instructions executable by at least one processor to cause it to:
receive additional song lyric interaction data describing additional interactions between the user and additional segments of song lyrics using a plurality of selected lyric interaction options from the menu of options;
identify musical characteristics associated with the additional segments of song lyrics described by the additional song lyric interaction data, the music characteristics comprising at least one of: a song, a musical artist, a musical genre, and a lyrical subject matter; and
generate the musical recommendation based on the identified musical characteristics.

10. The computer-readable storage medium of claim 6, further comprising instructions executable by at least one processor to cause it to:
receive targeting information from an advertiser, the targeting information comprising user demographic information selected from a group consisting of: gender, age, geographic locations, and other demographic groupings;
select one or more advertisements based on the analysis of the song lyric interaction data and the received targeting information; and
provide the selected one or more advertisements to the client device.

11. A computer-implemented method for processing interactions with song lyrics, the method comprising:
providing a plurality of song lyrics for display on a plurality of client devices configured to provide the menu of options for a plurality of users to interact with segments of song lyrics selected by the plurality of users;
receiving a plurality of song lyric interaction data from the plurality of client devices, the song lyric interaction data describing user interactions between the plurality of users and the selected segments of song lyrics using selected lyric interaction options from the menu of options; and
updating a user interaction database to store song lyric interaction entries corresponding to the plurality of song lyric interaction data, the song lyric interaction entries identifying song lyric interaction times of the user interactions, a song lyric interaction entry identifying a user, song lyrics, a selected segment of the song lyrics, and a selected lyric interaction option;

determining a temporal correlation between a time of year and one or more words in a selected segment of song lyrics based on the song lyric interaction times of the song lyric interaction entries;

identifying correlated song lyrics comprising the one or more words of the determined temporal correlation;

generating, by a processor, a musical recommendation for a particular user based on the correlated song lyrics responsive to a present time matching the time of the year of the determined temporal correlation; and providing the musical recommendation to a client device of the particular user.

12. The method of claim 11, further comprising:

receiving demographic information of the particular user;

receiving a plurality of demographic information of the plurality of users;

determining a subset of the song lyric interaction entities identifying a subset of users having demographic information in common with the demographic information of the user;

determining a demographic correlation between a demographic characteristic and one or more words in the selected segments of song lyrics based on the plurality of demographic information of the plurality of users and the song lyric interaction entries;

identifying additional correlated song lyrics comprising the one or more words of the determined demographic correlation; and generating an additional musical recommendation based on the additional correlated song lyrics responsive to the demographic information of the particular user comprising the demographic characteristic of the demographic correlation.

13. The method of claim 11, further comprising:

receiving demographic information comprising gender of the particular user;

receiving a plurality of demographic information comprising genders of the plurality of users;

determining a gender correlation between lyric interaction options selected by the plurality of users and the genders of the plurality of users; and providing, to the client device of the particular user, a customized menu of options based on the gender of the particular user and the determined gender correlation.

* * * * *